(No Model.)

W. H. FOX & H. G. RICHEY.
FARM GATE.

No. 305,382.  Patented Sept. 16, 1884.

WITNESSES
Wm M. Monroe.
Geo. W. King.

Wm H. Fox
and
Harlan G. Richey INVENTORS.
by
Leggett and Leggett ATTORNEYS

UNITED STATES PATENT OFFICE.

WILLIAM H. FOX AND HARLAN G. RICHEY, OF BLUFFTON, INDIANA, ASSIGNORS TO THEMSELVES AND JAMES CROSBIE, JR., OF SAME PLACE.

FARM-GATE.

SPECIFICATION forming part of Letters Patent No. 305,382, dated September 16, 1884.

Application filed January 18, 1884. (No model.)

*To all whom it may concern:*

Be it known that we, WILLIAM H. FOX and HARLAN G. RICHEY, of Bluffton, in the county of Wells and State of Indiana, have invented certain new and useful Improvements in Farm-Gates; and we do hereby declare the following to be a full, clear, and exact description of the invention, such as will enable others skilled in the art to which it pertains to make and use the same.

Our invention relates to improvements in farm-gates, the object of which is to provide a gate that, while it is being opened or closed, will be raised above the position it occupies when fully opened or closed, so as to pass over snow or other obstructions. A further object is to relieve the supporting-posts and attachments of the weight of the gate when it is opened or closed. A further object is to provide mechanism by means of which the gate may be opened or closed by a person in a carriage or on horseback. A further object is to arrange the actuating mechanism so that it will securely fasten the gate when it is closed or open.

With these objects in view our invention consists in certain features of construction, and in the combination of parts hereinafter described, and pointed out in the claim.

Figure 1:
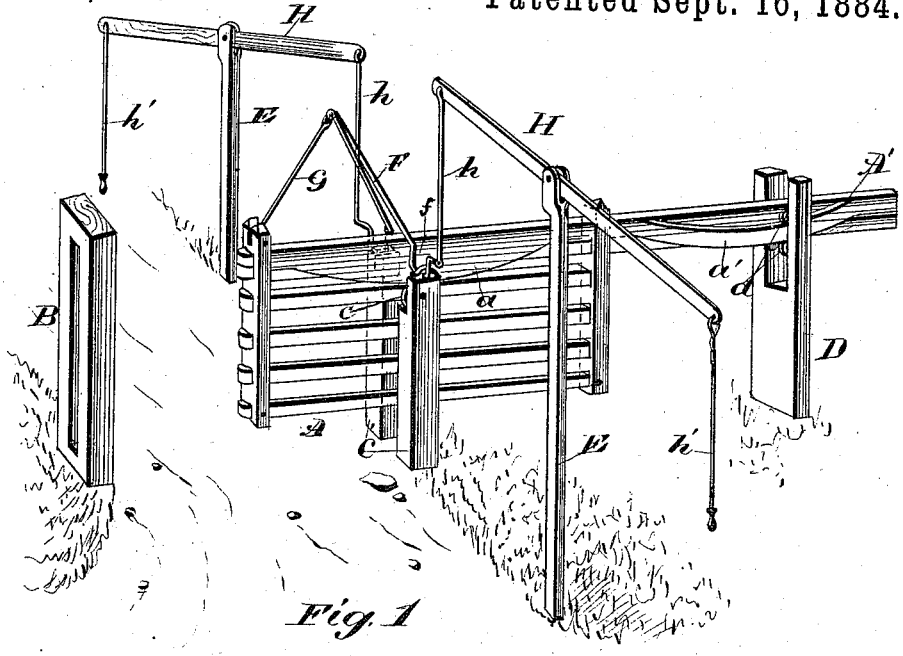
Figures 2, 3:
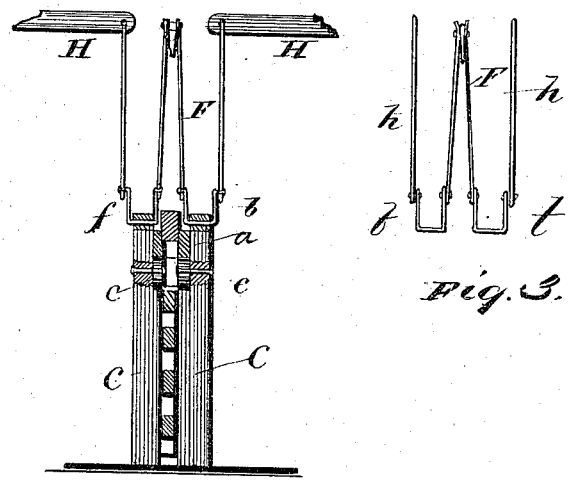

In the accompanying drawings, Figure 1 is a view in perspective of our improved gate. Fig. 2 is a transverse vertical section of the same. Fig. 3 is a view in detail.

A represents the gate, which, as shown in Fig. 1, is partially opened.

B is the post in front of the gate; C C, the main supporting-posts, and D the rear posts.

E E are posts respectively at some distance on each side of the gate to which the actuating-levers are attached. On each side of the gate are curved ways $a$, resting upon rollers $c$, attached to the posts C.

A' is an arm or extension of the rear end of the gate, which, when the gate is closed, reaches to the post D. This arm is provided with ways $a'$, the bottoms of which are facsimiles of the bottoms of the ways $a$. The top edges of these ways are curved so that the two edges are parallel. The ways $a'$ pass between the rollers $d$, attached to the posts D. The arm A', by means of its curved ways, supported by rollers above and below, holds the gate at all times in a horizontal position. The curved ways raise the gate above the ground in its passage in either direction, so that it may pass over snow or other obstruction.

The arrangement of parts is such that the gate, when fully opened or closed, rests upon the ground or other supports—such as blocking—arranged for the purpose, so that the supporting rollers and posts are relieved of the weight of the gate, and thus is avoided all sagging and displacement of these supporting parts.

In operating the gate by means of the curvature of the ways, the gate is immediately raised from contact with the ground or blocking, and made to move easily in either direction. A rod is bent into the shape shown in Fig. 1, forming a long crank, F, in the center, and short cranks $f$ on either side. This triple crank is journaled on top of the posts C, and the long crank is connected by the rod G to the front end of the gate. The short cranks $f$ are connected by the rods $h$ to the levers H, fulcrumed respectively on the posts E. The outer ends of these levers are provided with the hand-rods $h'$. The length and positions of the levers H are such as to bring the rods $h'$ in convenient positions to be reached respectively from carriages on either side of the gate. When the gate is closed the crank F and the rod G are extended along the top of the gate, and are on one of the "dead-centers," and when the gate is open they are on the other dead-center, so that in either of these positions the gate is securely fastened. The post B may be in two parts, separated to admit the end of the gate, and thus secure it against lateral pressure. If the post is one piece, it should be grooved to receive the end of the gate. It is not essential that there be a set of ways on each side of the gate, as one set of ways and rollers could be made to operate the gate, but would not balance the gate so well as the two sets.

If, to lessen the initial cost of the gate, it is desired to use but one set of ways and rollers, in order to balance the gate the ways should be placed in the lateral center of the gate instead of on the sides, as shown.

In opening or closing the gate, by pulling down on one of the handles $h'$ with sufficient force until the cranks $f$ and the attached rods $h$ have reached their dead-centers, the gate will have attained sufficient momentum to carry it past this dead-point, and, aided by its gravity, will usually run down the incline and reach its terminus without further aid. After passing the said dead-centers a push upward on the handle may be made, if required.

If preferred, instead of using the arm A', the gate may be made of sufficient length so that the rear end thereof could be used in place of arm A'. In this case the ways would be secured to the rear end of the gate in the same manner as they are attached to the front end, and the gate might be made to balance itself without the aid of the rear upper rollers, and these rollers might, therefore, be omitted.

The cranks may be made in pieces; but we prefer to make them of a single rod, on account of its cheapness.

We are aware that it is not broadly new to provide a gate with a rearward extension, gate-posts with rollers on which the gate and extension rest, and hand-levers and links connecting the hand-levers and gate whereby the latter is moved; also, that it is not new to provide a double gate the top panels of which are double inclined and rest on rollers, for the purpose of elevating the gate as the latter is opened and closed, and hence we make no broad claim, therefore; but

What we claim is—

In a farm-gate, the combination of the posts C and D, having rollers journaled thereto, a gate having a rearward extension, the curved ways secured to said gate and extension, the cranks F, journaled on the upper ends of the posts C, the levers H, rods connecting the short arms of the cranks with the levers, and rod G, all of the above parts arranged as described.

In testimony whereof we sign this specification, in the presence of two witnesses, this 12th day of January, 1884.

WILLIAM H. FOX.
HARLAN G. RICHEY.

Witnesses:
L. MASON,
A. N. MARTIN.